S. FRIEDMAN.
GAGE.
APPLICATION FILED OCT. 26, 1915.

1,229,930.

Patented June 12, 1917.

WITNESSES
George L. Blume.

INVENTOR
Samuel Friedman
BY
ATTORNEYS

UNITED STATES PATENT OFFICE.

SAMUEL FRIEDMAN, OF BROOKLYN, NEW YORK.

GAGE.

1,229,930. Specification of Letters Patent. Patented June 12, 1917.

Application filed October 26, 1915. Serial No. 58,032.

*To all whom it may concern:*

Be it known that I, SAMUEL FRIEDMAN, a citizen of the United States, and a resident of the city of New York, borough of Brooklyn, in the county of Kings and State of New York, have invented a new and Improved Gage, of which the following is a full, clear, and exact description.

The object of the invention is to provide a new and improved gage for internal and external gaging purposes and arranged to permit convenient gaging of rotating work without danger of the gage sticking to the work.

In order to accomplish the desired result, use is made of a gaging member and a supporting or a handled member on which the said gaging member is mounted to rotate by the use of an antifriction bearing to allow free rotation of the gaging member with the work and while the supporting member is held against movement by the user.

A practical embodiment of the invention is represented in the accompanying drawings forming a part of this specification, in which similar characters of reference indicate corresponding parts in all the views.

Figure 1:
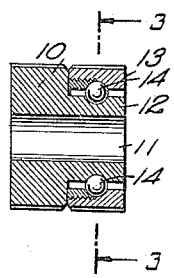
Figure 1 is a longitudinal central section of the gage arranged for externally gaging the work.
Figure 2:
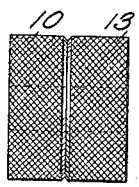
Fig. 2 is a side elevation of the same.
Figure 3:
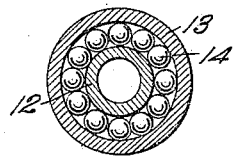
Fig. 3 is a cross section of the same on the line 3—3 of Fig. 1.

The external gage, shown in Figs. 1, 2 and 3, consists essentially of a cylindrical gage member 10 having a bore 11, preferably of standard size, having at one end a reduced portion 12 on which is mounted a supporting member 13 by the use of a ball bearing or other antifriction bearing 14. The peripheral faces of the gage members 10 and 13 are arranged one alongside the other, and the said members are of the same diameter and each has its peripheral face knurled or roughened to permit the user to take convenient hold of either member of the gage and the said member firmly held. When it is desired to gage a revolving rod, for instance, mounted in a lathe, the operator can readily slip the gage on the rod by engaging the bore 11 with the rod to gage the same, the operator having hold of the peripheral face of the supporting member 13 so that in case the member 10 sticks to the rod it can conveniently rotate with the rod while the supporting member 13 is held stationary by the user. It will also be noticed that as the operator has hold of the supporting member 13 the gage can be readily slipped off the rod after the gaging is accomplished. In case the gage is applied on a rod for an easy fit, the operator can take hold of the gaging member 10 instead of the supporting member 13 to gage the loose fit by feeling.

Figure 4:
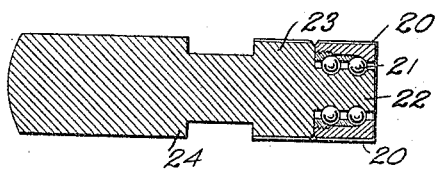
Fig. 4 is a longitudinal central section of the gage arranged for internally gaging the work.
Figure 5:
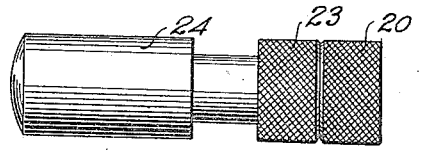
Fig. 5 is a side elevation of the same.

The internal gage shown in Figs. 4 and 5 consists essentially of a cylindrical gaging member 20 mounted to rotate by the use of a ball bearing 21 on the reduced end 22 of the supporting member 23 having a handle 24 adapted to be taken hold of by the operator for engaging the member 20 with the aperture in the work. It will be noticed that by the arrangement described the gaging member 20 is free to rotate with the work while the supporting member 23 is held stationary by the user.

Having thus described my invention, I claim as new and desire to secure by Letters Patent:

1. A gage for gaging rotating work, comprising a supporting member adapted to be held by the operator, and a cylindrical gage member, one of the members having a reduced end and the other member being in the form of a ring and mounted to turn on the said reduced end, the members being approximately of the same diameter.

2. A gage adapted to be held by the operator for gaging rotating work, comprising two cylindrical members, one being a supporting member and the other a gage, one member being in the form of a ring secured to and mounted to turn on the other member, the said members having their axes coinciding and their peripheral faces flush with each other and knurled to permit the user to firmly hold either member.

3. A gage for gaging rotating work, comprising a supporting member adapted to be held by the operator, a cylindrical member, one of the members having a reduced end and the other member being in the form of a ring and mounted to turn on the said reduced end, the said members being approximately of the same diameter, and a ball bearing interposed between the said reduced end and the ring-shaped member.

4. A gage for gaging rotating work, comprising a cylindrical gage member having a bore and provided with a reduced portion at one end and a supporting member adapted to be held by the operator, said member being in the form of a ring and secured to and mounted upon the reduced portion of the gage member, each of said members being mounted to turn relatively one to the other.

5. A gage for gaging rotating work, comprising a cylindrical gage member having a bore and provided with a reduced portion at one end, a supporting member adapted to be held by the operator said member being in the form of a ring secured to and mounted on the reduced portion of the said gage member, and a ball bearing interposed between the said reduced portion and the said supporting member, each of the said members being free to turn relatively one to the other.

In testimony whereof I have signed my name to this specification in the presence of two subscribing witnesses.

SAMUEL FRIEDMAN.

Witnesses:
NATHAN S. YOUDELMAN,
DAVID KATZ.

Copies of this patent may be obtained for five cents each, by addressing the "Commissioner of Patents, Washington, D. C."